(12) United States Patent
Herman

(10) Patent No.: US 11,291,307 B2
(45) Date of Patent: Apr. 5, 2022

(54) BODY SUPPORT

(71) Applicant: Ergotech Solutions, Inc., Burlington (CA)

(72) Inventor: Craig Herman, Burlington (CA)

(73) Assignee: Ergotech Solutions, Inc., Burlington (CA)

( * ) Notice: Subject to any disclaimer, the term of this patent is extended or adjusted under 35 U.S.C. 154(b) by 0 days.

(21) Appl. No.: 16/748,970

(22) Filed: Jan. 22, 2020

(65) Prior Publication Data

US 2020/0154896 A1 May 21, 2020

Related U.S. Application Data

(63) Continuation of application No. PCT/CA2019/050487, filed on Apr. 18, 2019.

(60) Provisional application No. 62/879,560, filed on Jul. 29, 2019, provisional application No. 62/795,129, filed on Jan. 22, 2019, provisional application No. 62/720,254, filed on Aug. 21, 2018, provisional application No. 62/718,419, filed on Aug. 14, 2018, (Continued)

(51) Int. Cl.

| | |
|---|---|
| *A47C 9/02* | (2006.01) |
| *A47C 9/06* | (2006.01) |
| *A47C 3/26* | (2006.01) |
| *B61D 33/00* | (2006.01) |
| *B64D 11/06* | (2006.01) |
| *B60N 2/24* | (2006.01) |
| *A47C 1/126* | (2006.01) |

(52) U.S. Cl.
CPC ............... *A47C 9/06* (2013.01); *A47C 1/126* (2013.01); *A47C 3/26* (2013.01); *A47C 9/025* (2013.01); *B61D 33/0078* (2013.01); *B64D 11/0691* (2014.12); *B64D 11/0698* (2014.12); *B60N 2002/247* (2013.01)

(58) Field of Classification Search
CPC .......... A47C 1/126; A47C 9/06; A47C 9/025; A47C 3/26; B64D 11/0691; B64D 11/0698; B60N 2002/47; B60N 2002/247; B61D 33/0078; A47B 5/00
USPC ......... 297/14; 244/118.6; 211/90.02; 108/42, 108/47, 48, 147.11, 147.17, 152
See application file for complete search history.

(56) References Cited

U.S. PATENT DOCUMENTS

| | | | | |
|---|---|---|---|---|
| 324,602 | A | * | 8/1885 | Solliday .................... A47F 5/13 108/147.11 |
| 491,093 | A | * | 2/1893 | Edgerton ............... B44D 3/123 248/213.2 |

(Continued)

FOREIGN PATENT DOCUMENTS

| | | | | |
|---|---|---|---|---|
| BR | PI0901156 A2 | * | 11/2010 | .............. A47C 9/06 |
| BR | MU9100686 U2 | * | 6/2013 | .............. A47C 9/06 |

(Continued)

OTHER PUBLICATIONS 3 page PDF of PCT/ISA/237 form for PCT/CA2019/050487, mailed Feb. 7, 2019. (Year: 2019).*

*Primary Examiner* — Robert Canfield
(74) *Attorney, Agent, or Firm* — Dinsmore & Shohl LLP

(57) ABSTRACT

An apparatus for use with a wall and by a person leaning against the wall and including: a receiver mounted in use to the wall; a support having an operative position whereat the support generally follows the curvature of the buttocks of the person; and a mechanism adapted to suspend the support from the receiver at the operative position.

10 Claims, 33 Drawing Sheets

Related U.S. Application Data provisional application No. 62/660,543, filed on Apr. 20, 2018.

(56) References Cited

U.S. PATENT DOCUMENTS

| | | | | |
|---|---|---|---|---|
| 3,116,091 | A * | 12/1963 | Bethoon | A47C 3/12 |
| | | | | 297/325 |
| 3,181,828 | A * | 5/1965 | Cramer | A47C 7/029 |
| | | | | 248/125.3 |
| 4,186,450 | A * | 2/1980 | Rosenberg | A47C 9/06 |
| | | | | 4/661 |
| 4,730,697 | A * | 3/1988 | Campbell | E06C 7/16 |
| | | | | 182/121 |
| 4,902,069 | A * | 2/1990 | Lehnert | B64D 11/0691 |
| | | | | 297/14 |
| 5,337,525 | A * | 8/1994 | Zaccai | A47K 3/003 |
| | | | | 4/578.1 |
| 6,170,096 | B1 * | 1/2001 | Rasmussen | A45D 19/08 |
| | | | | 4/519 |
| 6,474,732 | B1 * | 11/2002 | Merensky | B64D 11/0698 |
| | | | | 297/14 |
| 8,550,546 | B2 * | 10/2013 | Breit | A47C 4/20 |
| | | | | 297/60 |
| 8,561,550 | B2 * | 10/2013 | Raml | A47B 5/00 |
| | | | | 108/42 |
| 8,869,938 | B2 * | 10/2014 | Bassett | A01M 31/02 |
| | | | | 182/187 |
| 2006/0071510 | A1 * | 4/2006 | Jiang | A47C 9/06 |
| | | | | 297/14 |
| 2008/0235864 | A1 * | 10/2008 | Masciarelli | A47K 3/282 |
| | | | | 4/611 |
| 2011/0140499 | A1 * | 6/2011 | Masters | B60N 2/242 |
| | | | | 297/440.1 |

FOREIGN PATENT DOCUMENTS

| | | | | |
|---|---|---|---|---|
| CN | 204908668 U | | 12/2015 | |
| DE | 383120 C | * | 10/1923 | ............ A47C 9/06 |
| DE | 3708344 A1 | * | 10/1988 | ............ A47C 9/06 |
| DE | 102012107453 A1 | * | 2/2014 | ............ A47C 9/06 |
| EP | 176423 A | * | 4/1986 | ............ A47C 9/025 |
| EP | 325352 A2 | * | 7/1989 | |
| EP | 0402284 A1 | | 12/1990 | |
| FR | 1047580 A | * | 12/1953 | ............ B60N 2/305 |
| FR | 2536830 A1 | | 6/1984 | |
| FR | 2632505 A1 | | 12/1989 | |
| FR | 2928639 A1 | * | 9/2009 | ............ B60N 2/24 |
| GB | 349867 A | * | 6/1931 | ............ A47C 9/06 |
| GB | 432686 A | * | 7/1935 | ............ A47C 9/06 |
| GB | 2419084 A | | 4/2006 | |
| JP | 08131295 A | * | 5/1996 | ............ A47C 9/025 |
| WO | 2008107752 A2 | | 9/2008 | |

* cited by examiner

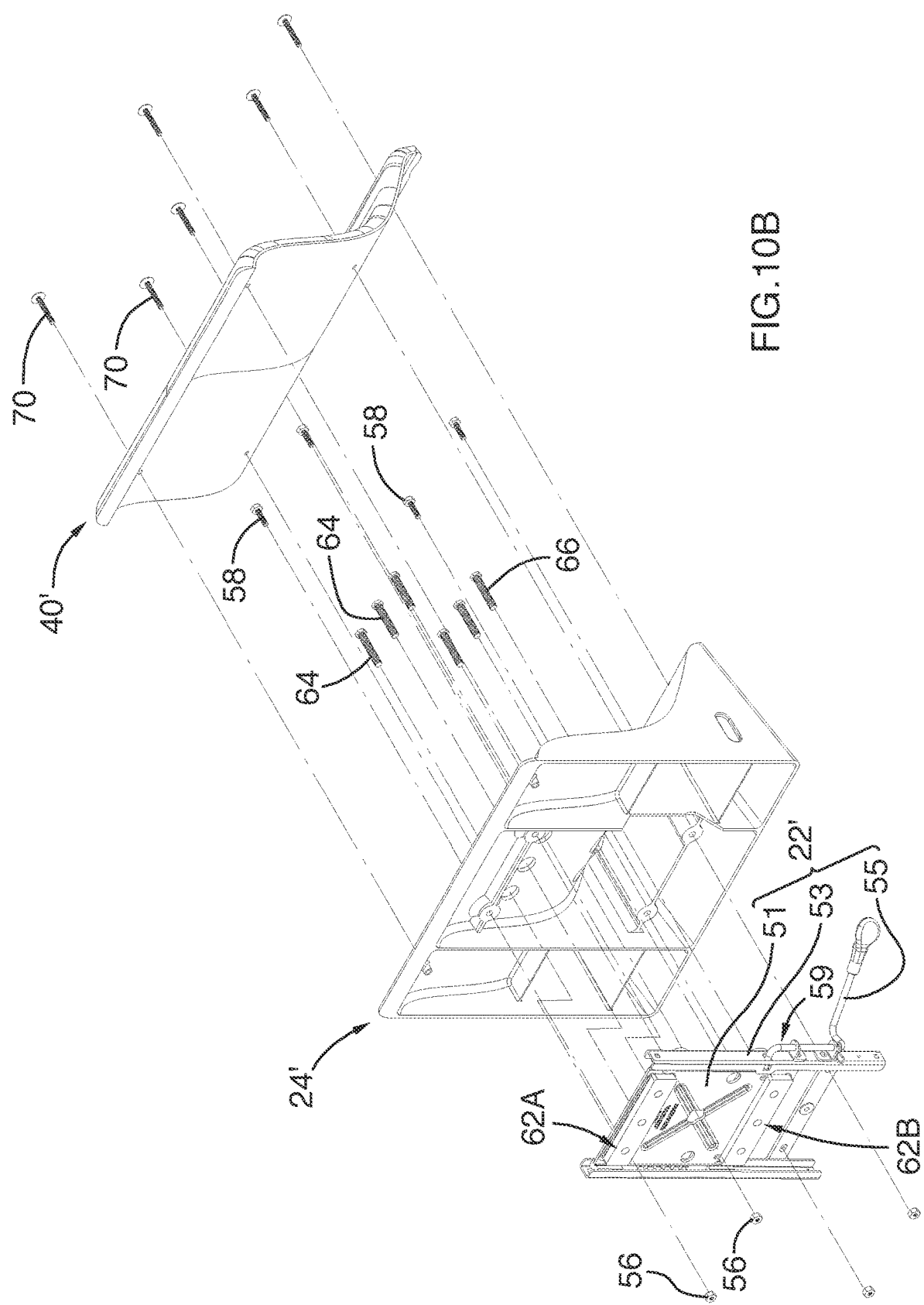

// BODY SUPPORT

CROSS-REFERENCE TO RELATED APPLICATIONS

This application is a continuation of International patent application number PCT/CA/2019/050487 filed Apr. 18, 2019, which in turn claims the priority of each of U.S. Ser. No. 62/660,543 filed Apr. 20, 2018, U.S. Ser. No. 62/718,419 filed Aug. 14, 2018 and U.S. Ser. No. 62/720,254 filed Aug. 21, 2018. The present application also claims the priority of U.S. Ser. No. 62/795,129 filed Jan. 22, 2019, U.S. Ser. No. 62/879,560 filed Jul. 29, 2019 and U.S. Ser. No. 62/942,975 filed Dec. 3, 2019, all of which are incorporated by reference.

FIELD

The invention relates to the field of seating.

BACKGROUND

It is well known to place chairs or benches in waiting areas where space permits but space does not always so permit.

SUMMARY OF THE INVENTION

Forming one aspect of the invention is apparatus for use with a wall and by a person leaning against the wall. This apparatus comprises: a receiver mounted in use to the wall; a support having an operative position whereat the support follows the curvature of the buttocks of the person; and a mechanism adapted to suspend the support from the receiver at the operative position.

According to another aspect, the mechanism can be adapted, in use, to permit the height of the support to be adjusted.

Advantages, features and characteristics of the present invention will become apparent to persons of ordinary skill in the art upon review of the following detailed description, with reference to the drawings, briefly described hereinafter.

BRIEF DESCRIPTION OF THE DRAWINGS

Reference will now be made to the attached drawings, when read in combination with the following detailed description, wherein like reference numerals refer to like parts throughout the several views, and in which:

FIG. 10B is a rear exploded view of the structure of FIG. 9A;

DETAILED DESCRIPTION

Figure 1:
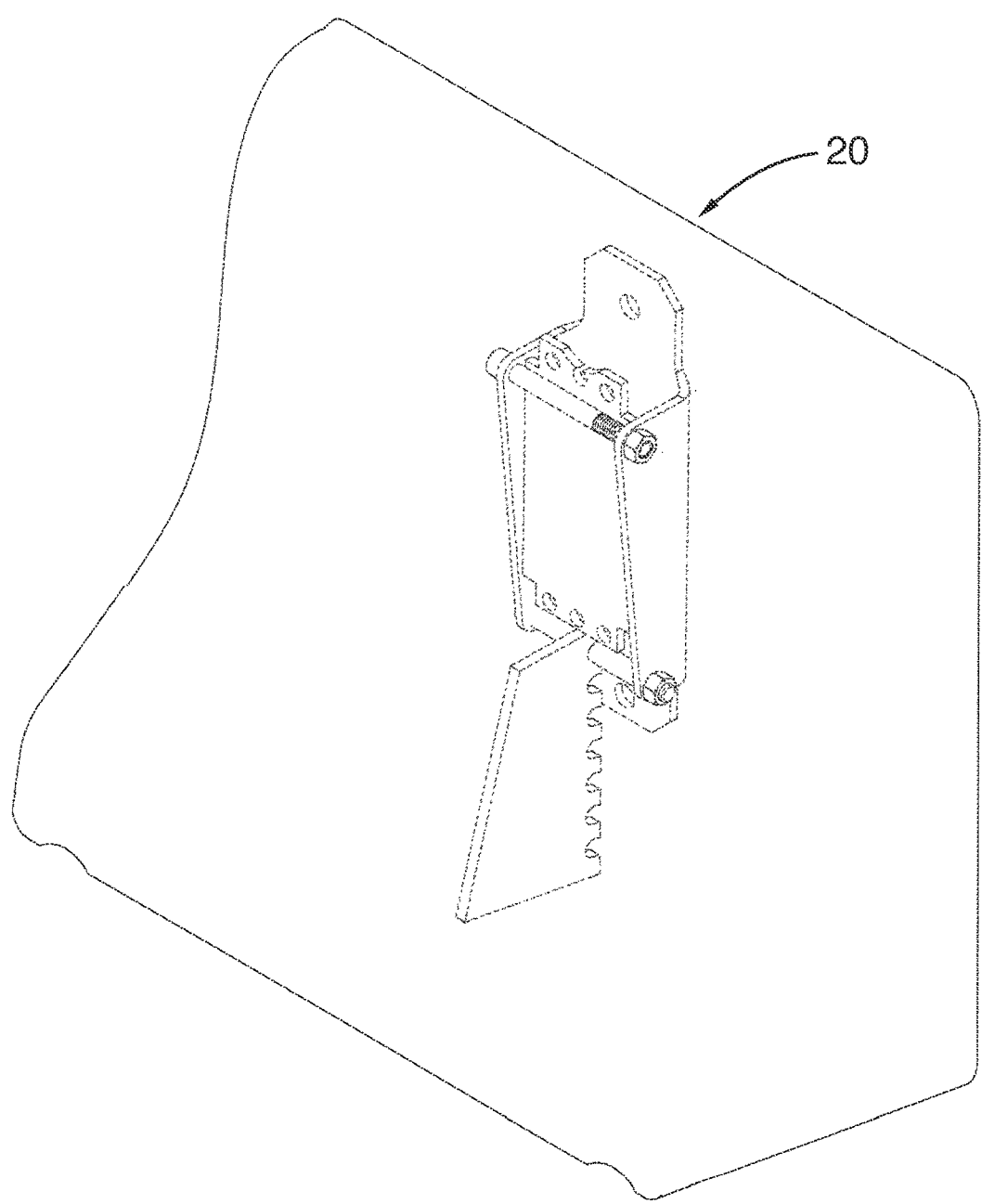
FIG. 1 is a front perspective view of an exemplary embodiment of the apparatus, with internal parts shown in phantom.
Figure 2:
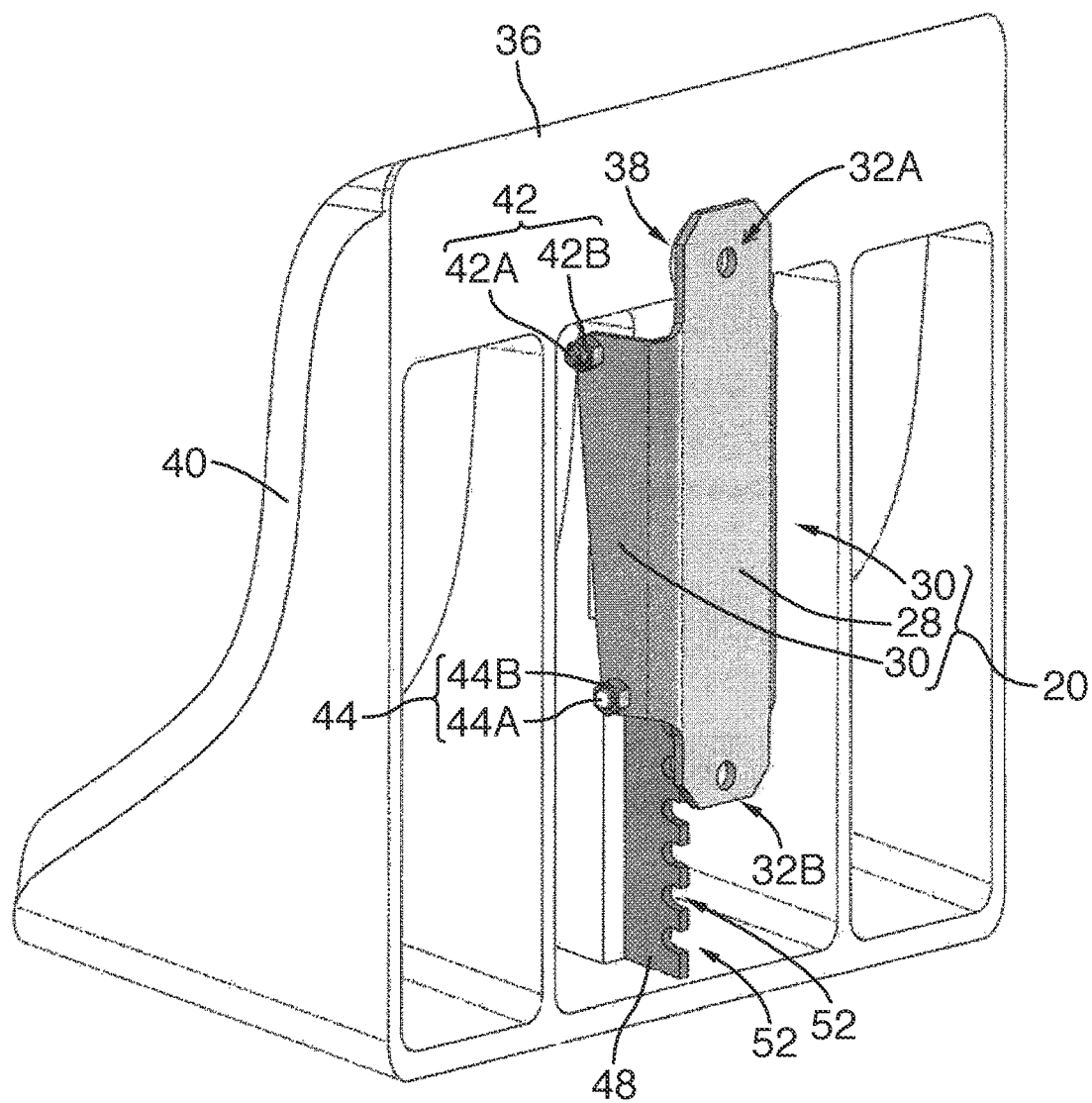
FIG. 2 is a rear view of the apparatus of FIG. 1.
Figure 3:
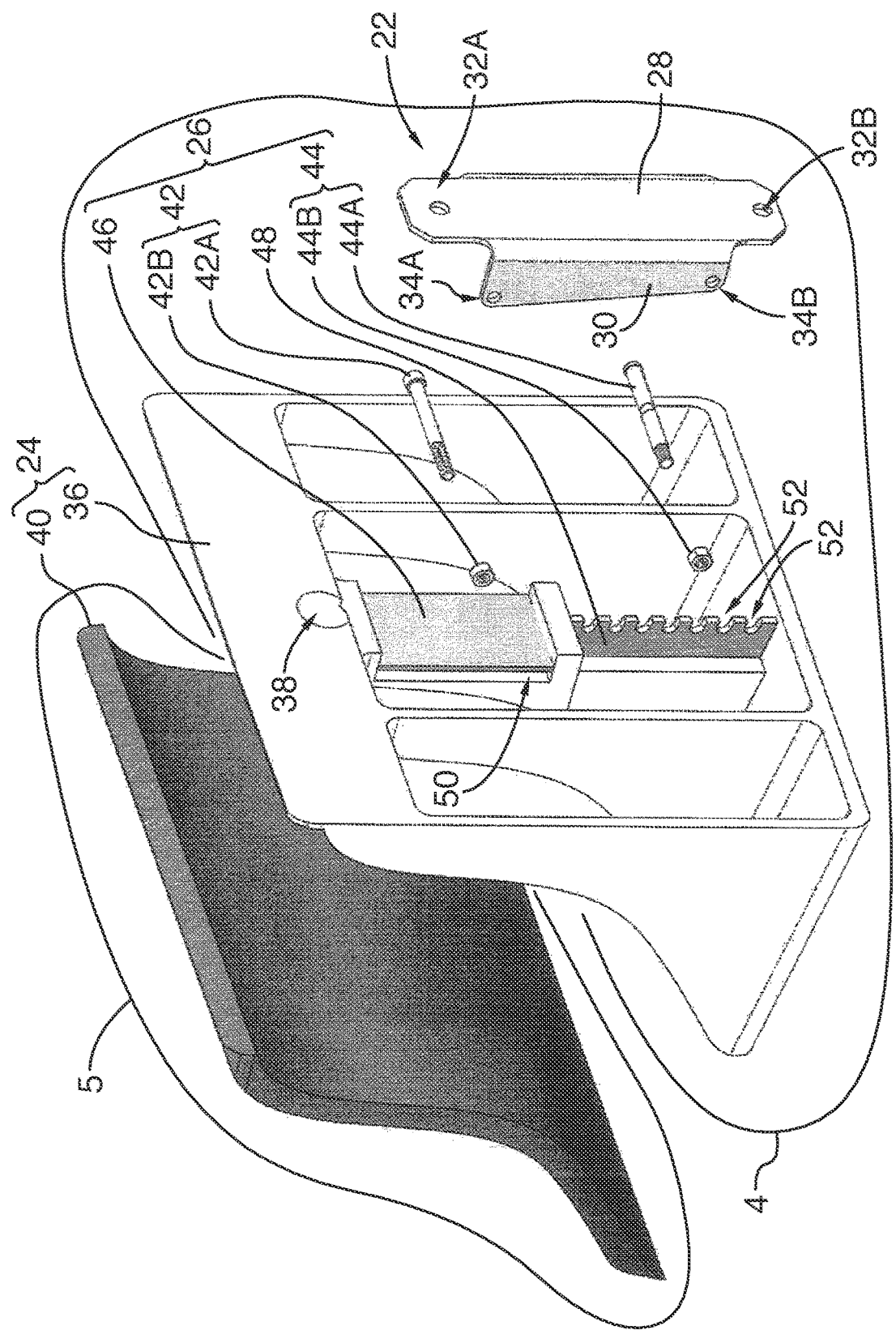
FIG. 3 is an exploded rear view of the apparatus of FIG. 1.

The exemplary apparatus 20 shown in FIG. 1 through FIG. 3 will be understood to comprise a receiver 22, a support 24 and a mechanism 26.

The exemplary receiver 22 is metal and comprises a backer plate 28 and a pair of flanges 30 extending from the backer plate 28 in spaced, parallel relation to one another. Mounting holes 32A,32B are defined in opposite ends of the backer plate 28 and each flange has apertures 34A,34B disposed in opposite ends.

The support 24 has a contoured plastic body 36 in which a socket 38 is defined and further has a resilient foam cover 40 which is adapted for snap-fit engagement with the body 36.

The mechanism 26 comprises a pair of protuberances 42,44, a metal capture plate 46 and a metal toothed plate 48.

Each of the pair of protuberances 42,44 will be seen to be defined by a bolt 42A,44A that extends between a pair of the mounting holes in the flanges 30 and is received by a nut 42B,44B.

The capture plate 46 is over molded within body 36 and defines, in combination with body 36, a channel 50 in which bolt 42A is captured.

The toothed plate 48 is also overmolded within body 36 and defines a plurality of grooved sockets 52.

Figure 4:
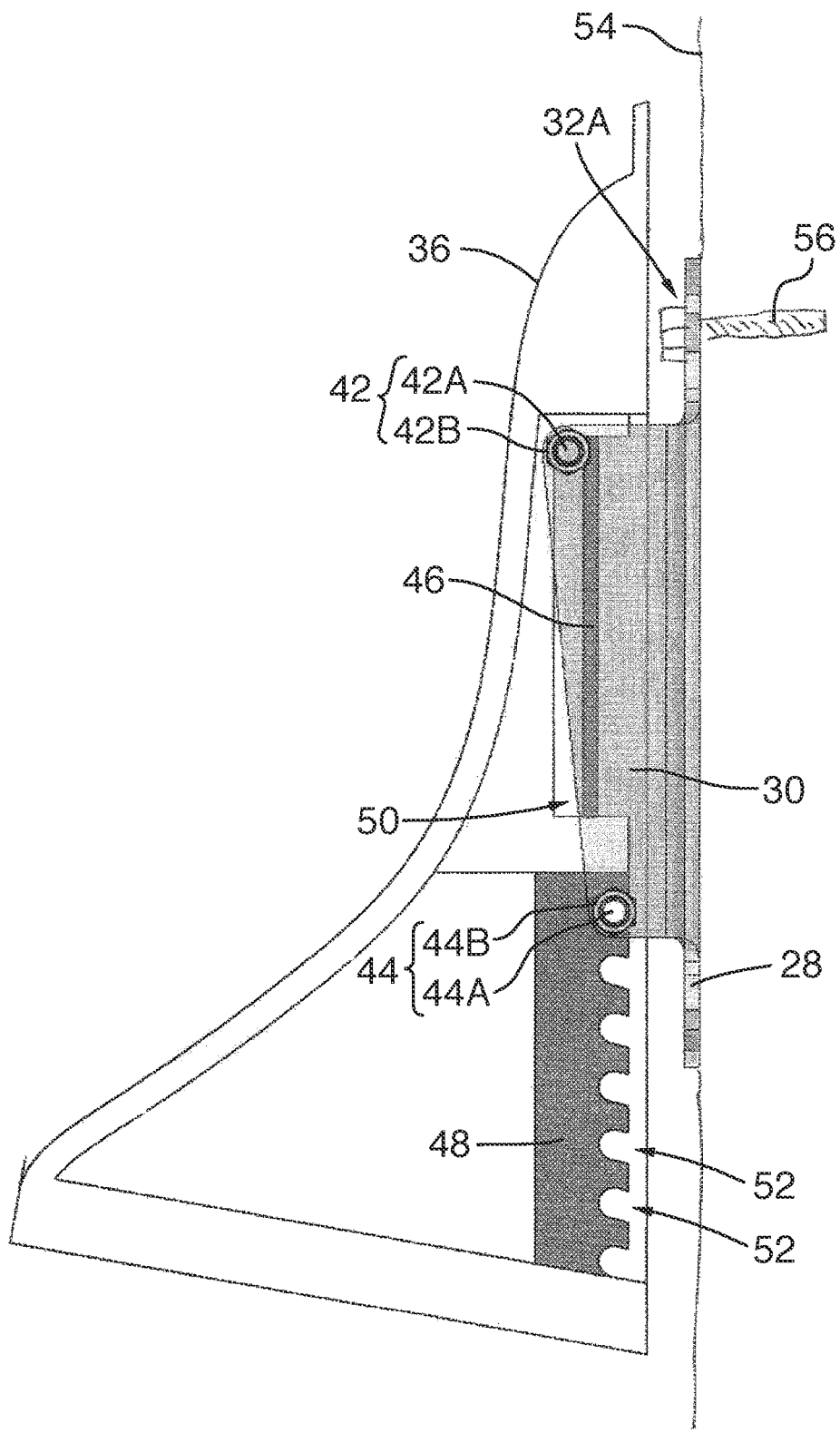
FIG. 4 is a side transparent view of the structure of encircled area 4 of FIG. 3 positioned for use against a wall, the support being disposed at a locking, fully lowered position relative to the receiver.
Figure 5:
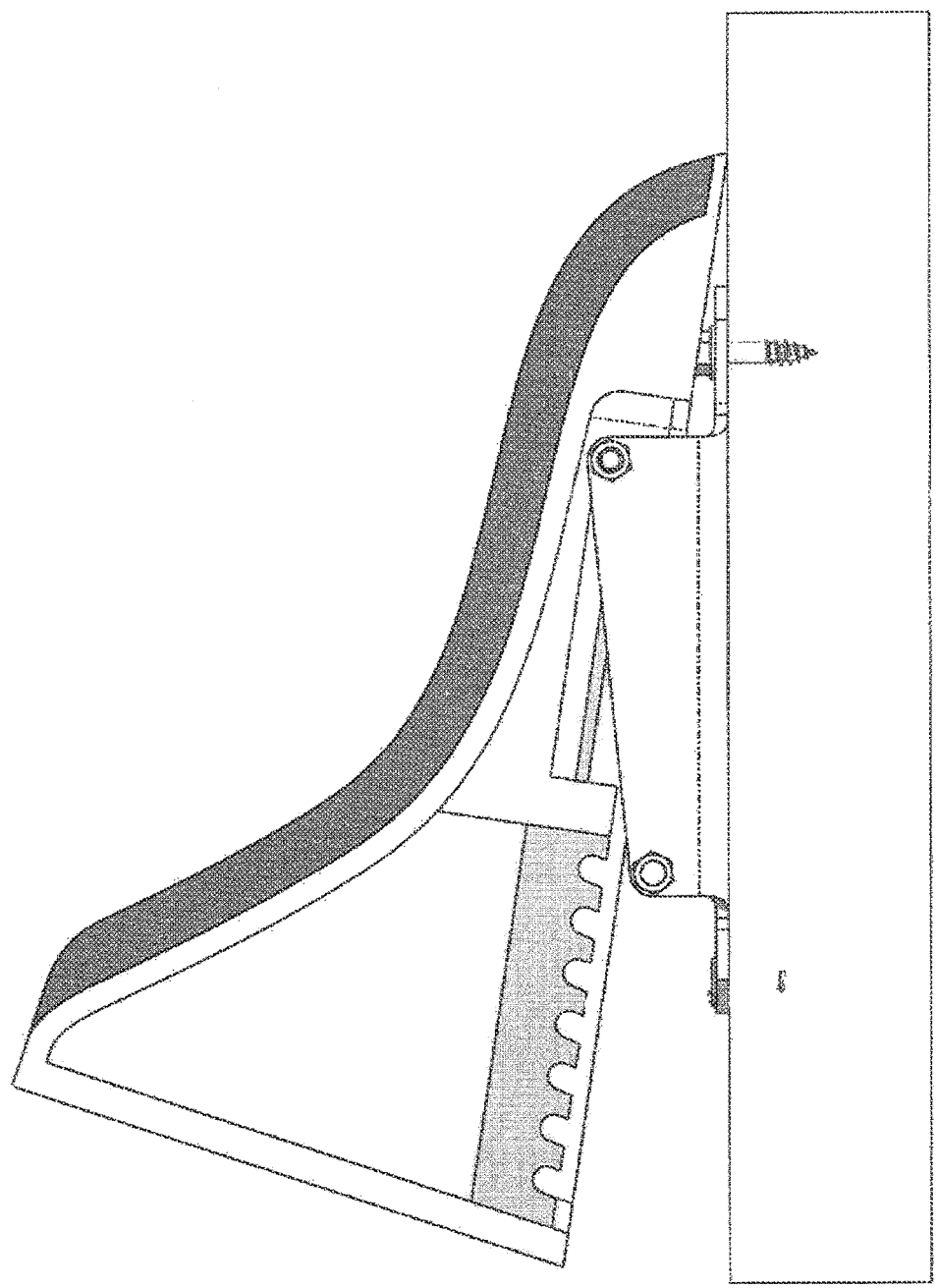
FIG. 5 is a transparent view of the structure of encircled area 5 of FIG. 3 assembled for use with the structure of FIG. 4, the support being disposed at a release, fully lowered position relative to the receiver.
Figure 6:
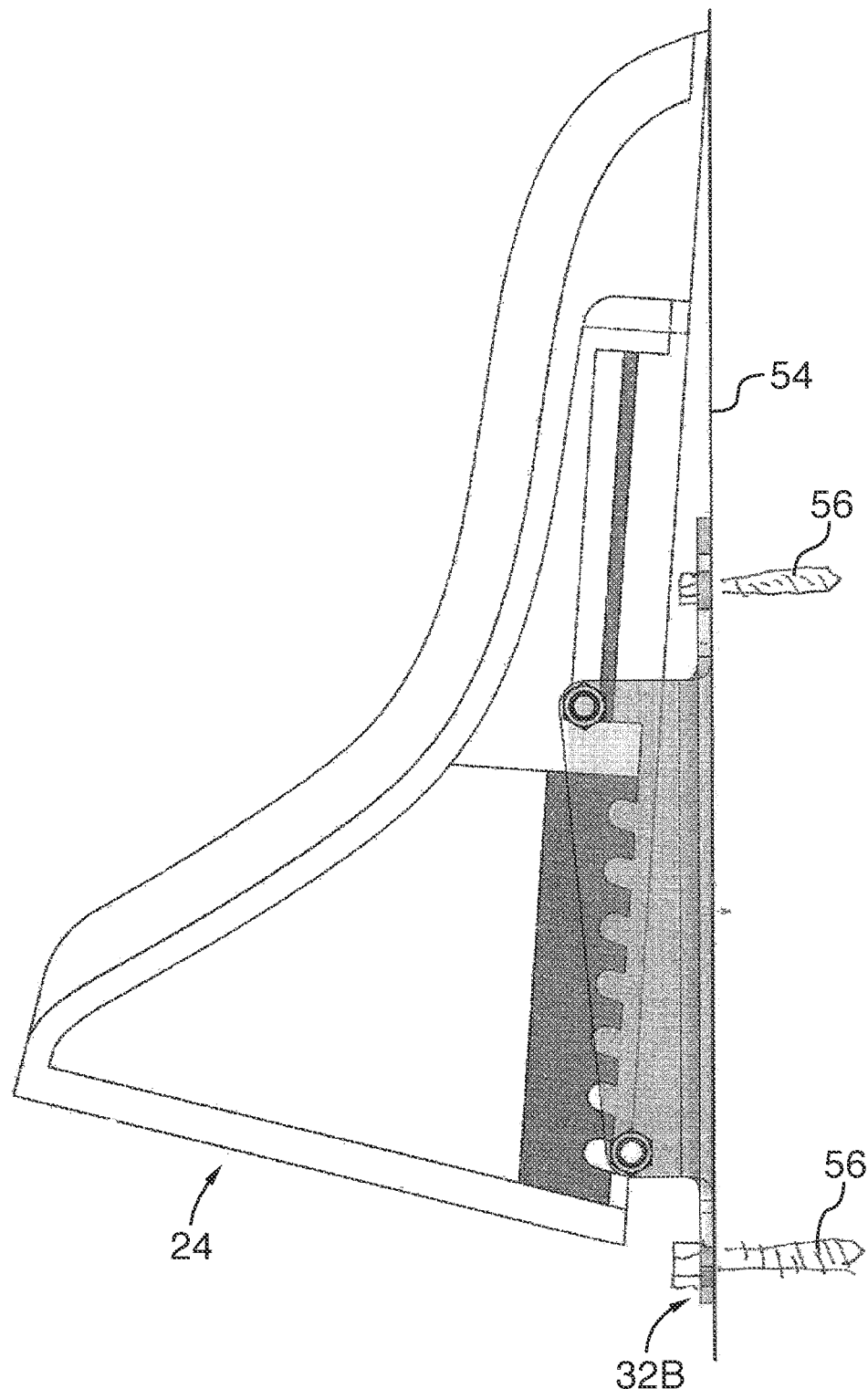
FIG. 6 is a view of the structure of FIG. 5, the support being disposed at a release, fully raised position relative to the receiver.
Figure 7:
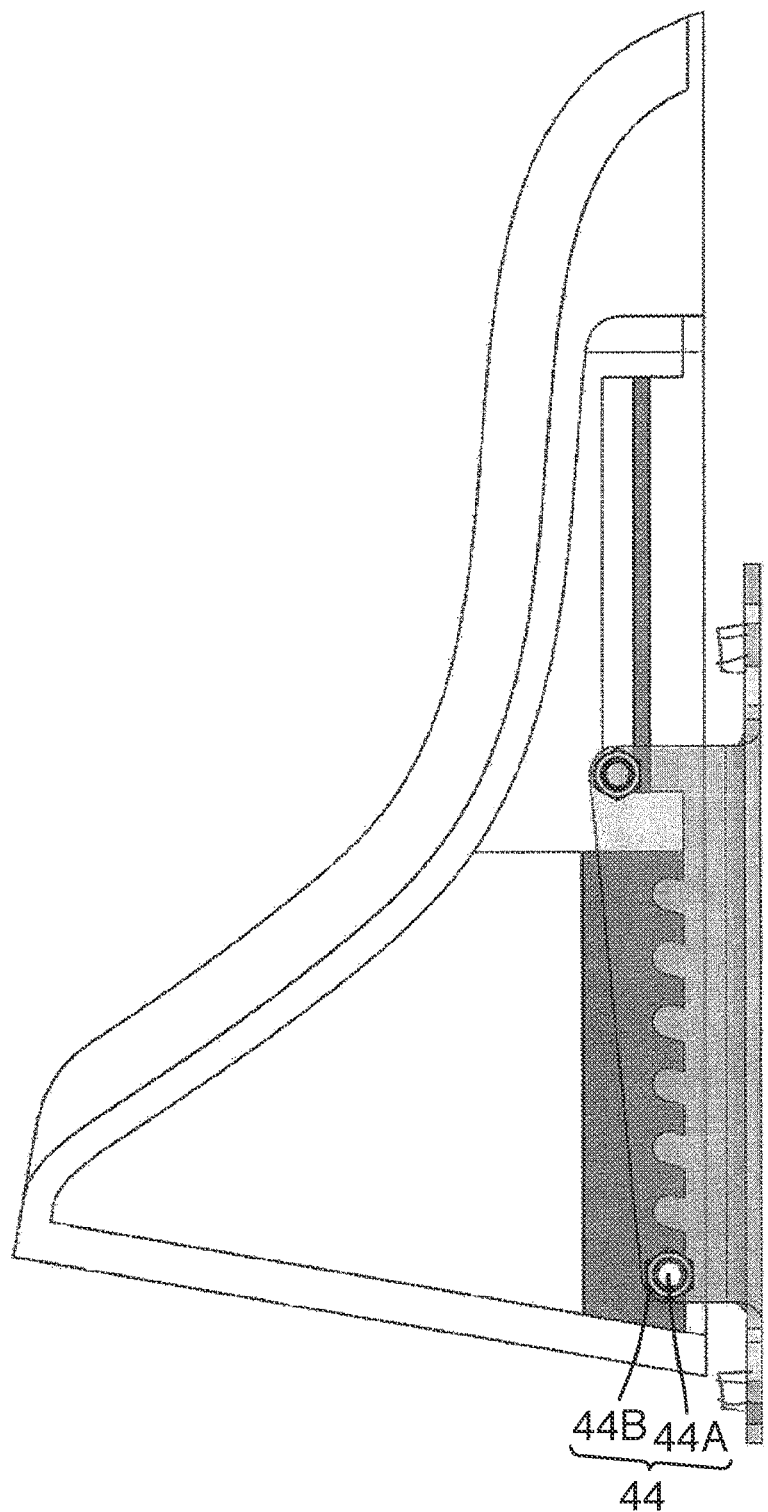
FIG. 7 is a view of the structure of FIG. 6, the support being disposed at a locking, fully raised position relative to the receiver.

For use:
Backer plate 28 is placed against a wall 54 and a fastener 56 is passed through socket 38 and through upper mounting hole 32A into the wall 54, such that protuberances 42, 44 extend horizontally, are vertically spaced from one another and horizontally spaced from one another, as shown in FIG. 4;
Cover 40 is snapped into place on body 36 and support 24 is pivoted to a release position, as shown in FIG. 5;
support 24 is raised to a fully raised position as shown in FIG. 6, and a further fastener 56 is passed through lower mounting hole 32B into the wall, thereby to rigidly secure receiver to the wall; and
support is pivoted to the locking position, whereat protuberance 44 engages one of sockets 52, thereby to resist further vertical movement, as shown in FIG. 7.

Figure 8:
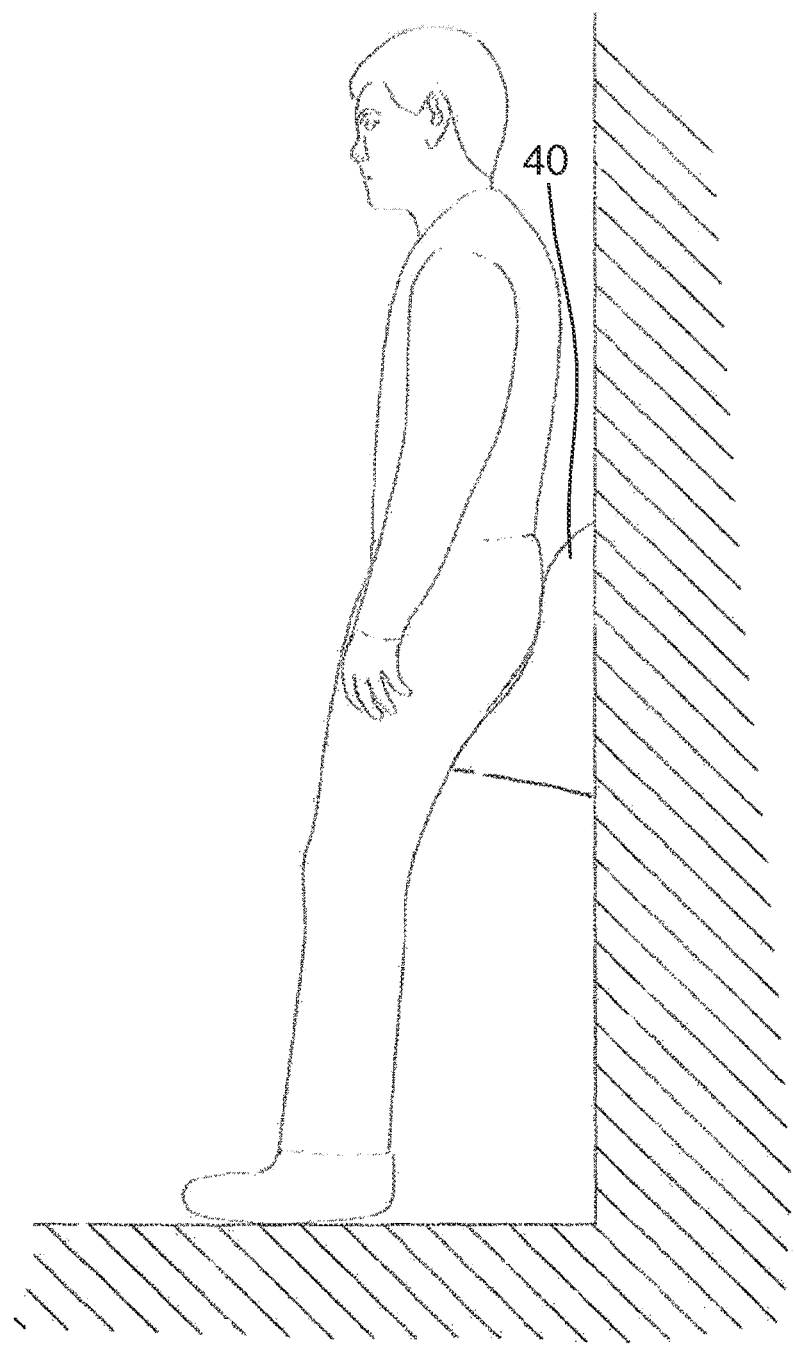
FIG. 8 is a view of the structure of FIG. 7 in use.
Figure 9A:
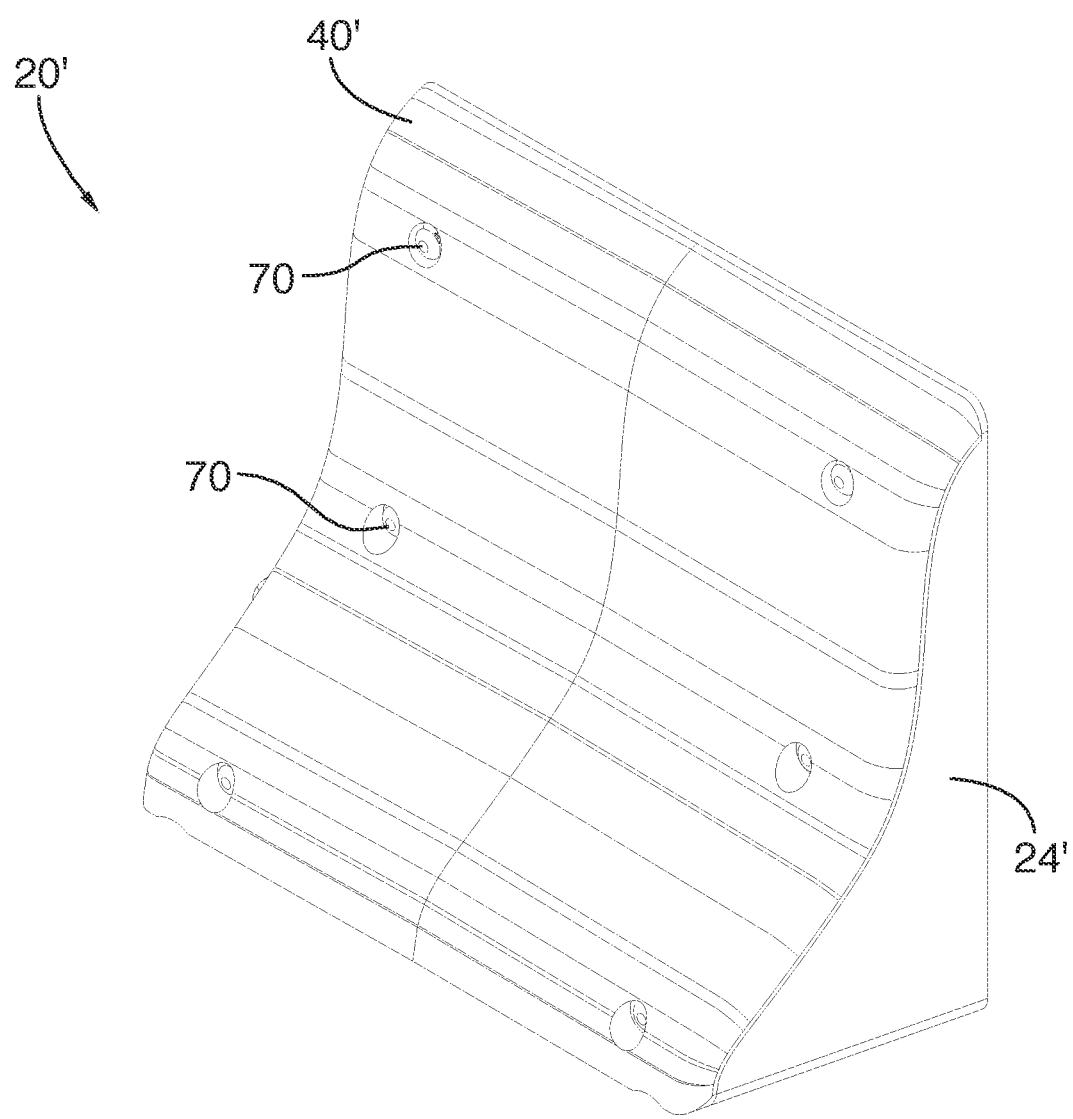
FIG. 9A is a front, top, left perspective view of another embodiment.
Figure 9B:
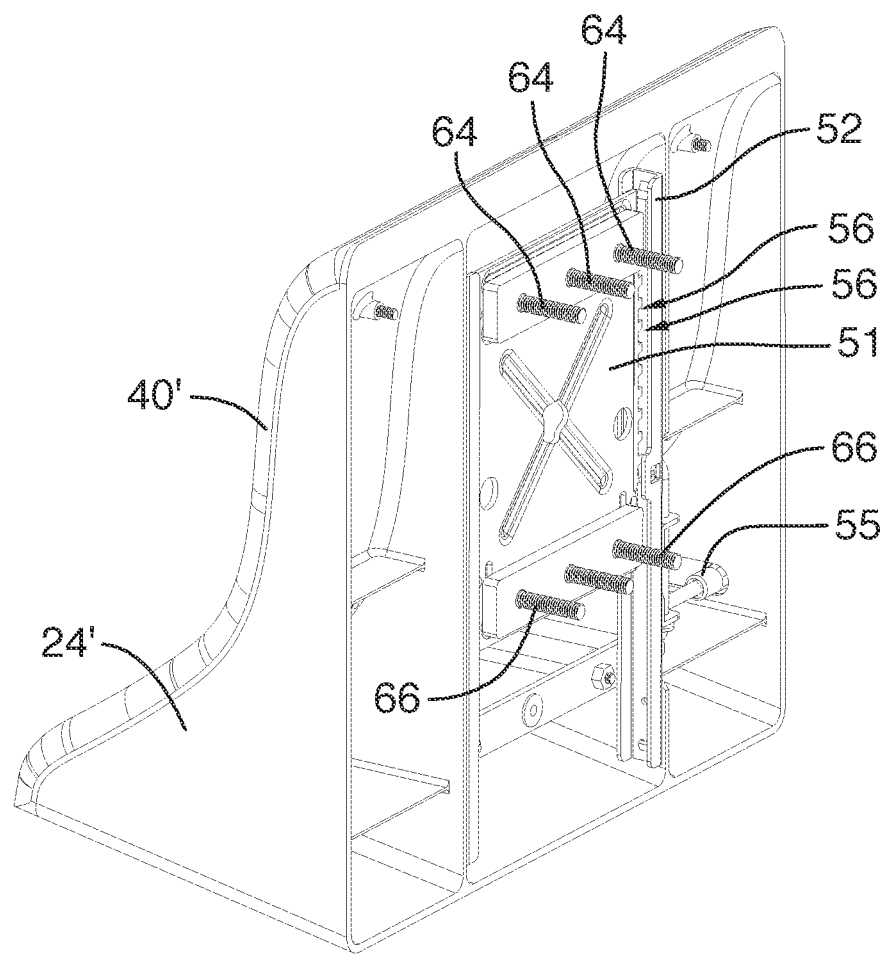
FIG. 9B is a rear, left, top perspective view of the structure of FIG. 9A.
Figure 9C:
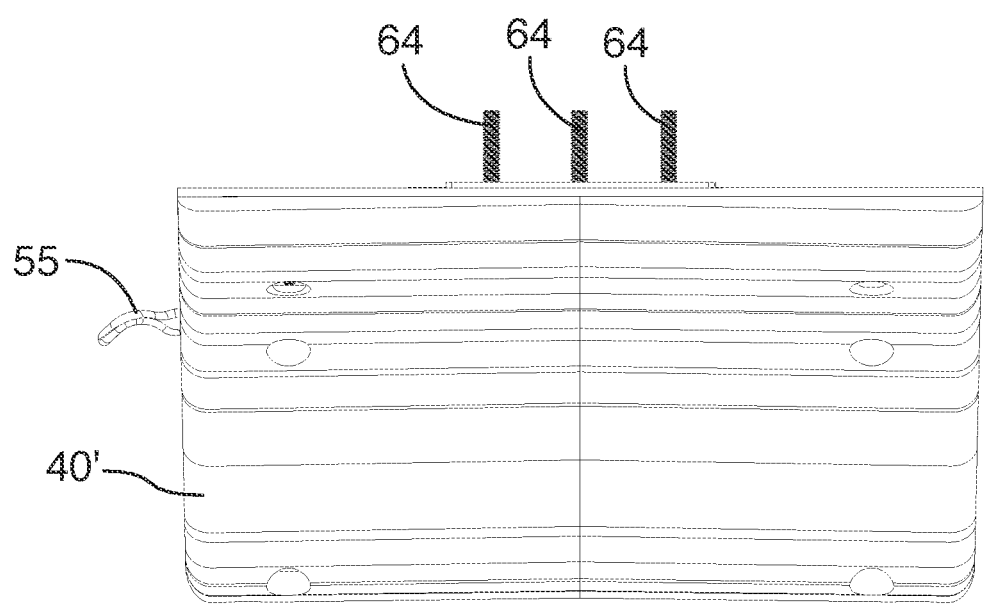
FIG. 9C is a top view of the structure of FIG. 9A.
Figure 9D:
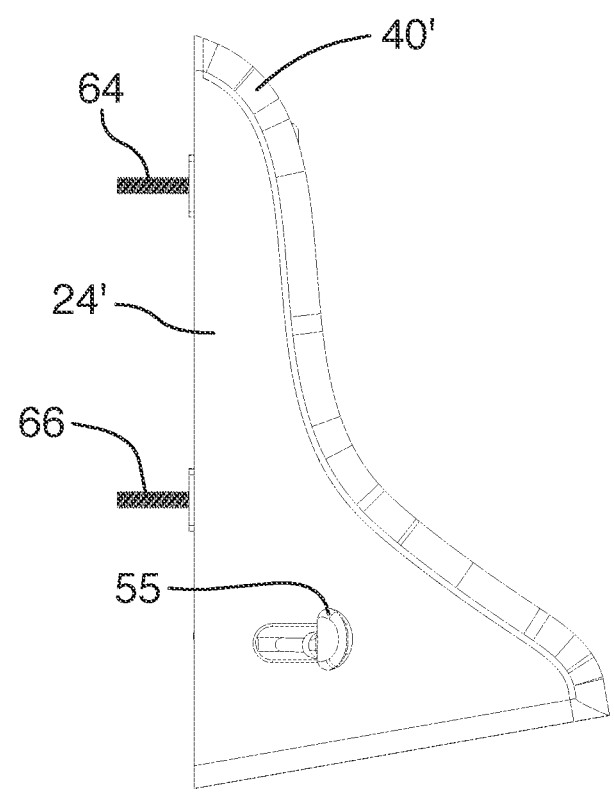
FIG. 9D is a right side view of the structure of FIG. 9A.
Figure 9E:
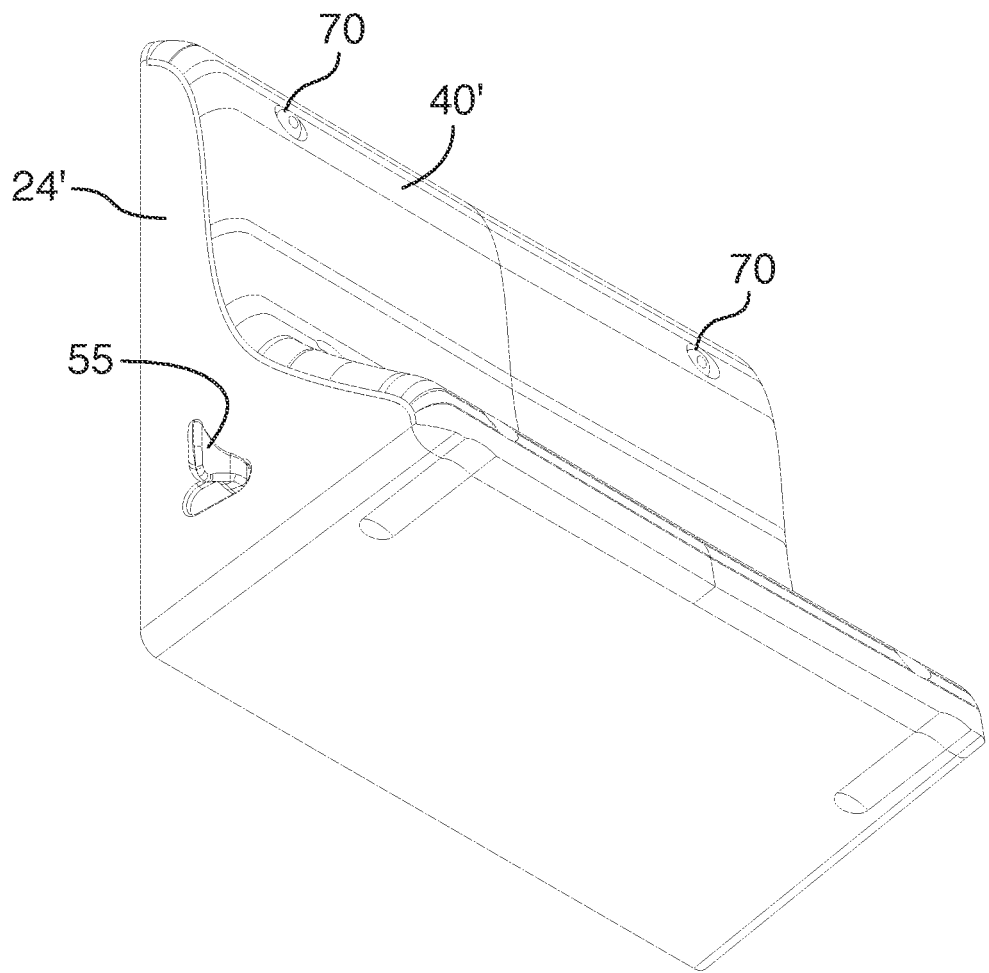
FIG. 9E is a bottom, right, front view of the structure of FIG. 9A.
Figure 9F:
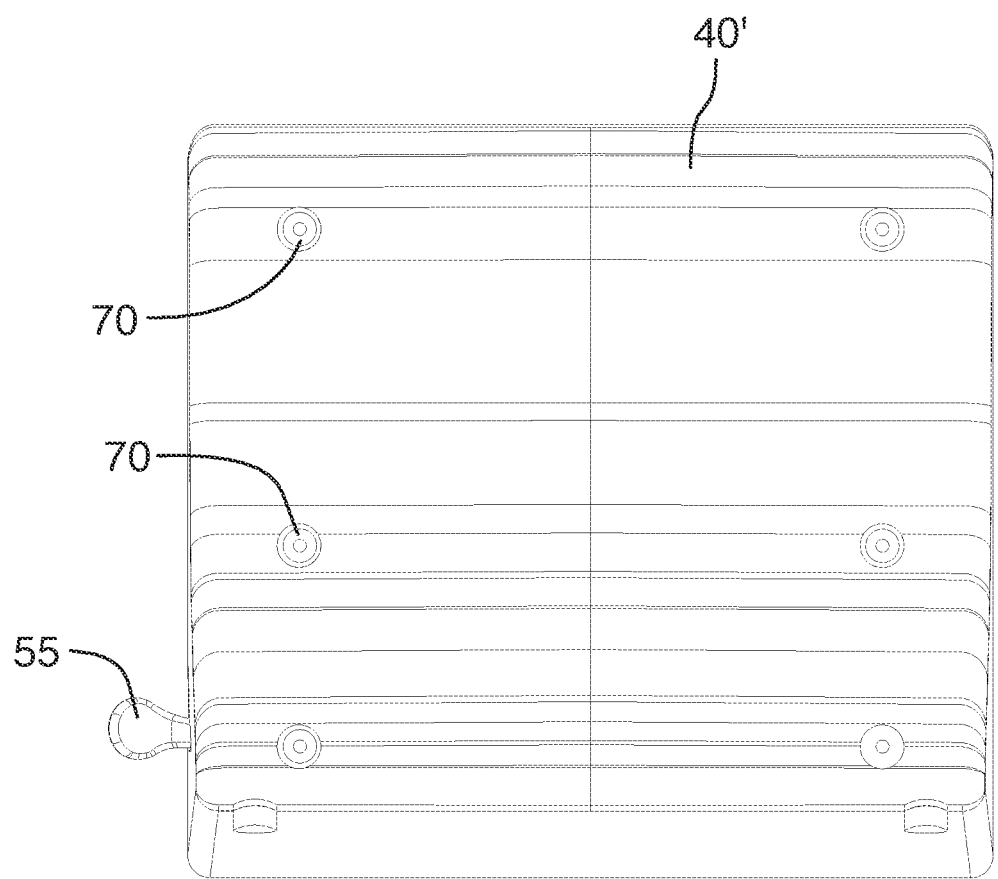
FIG. 9F is a front view of the structure of FIG. 9A.
Figure 9G:
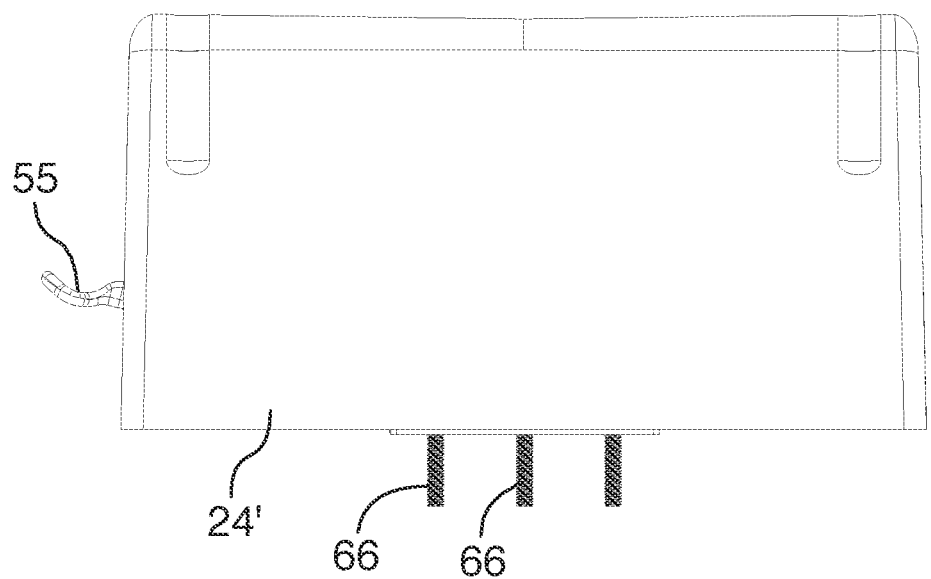
FIG. 9G is a bottom view of the structure of FIG. 9A.
Figure 9H:
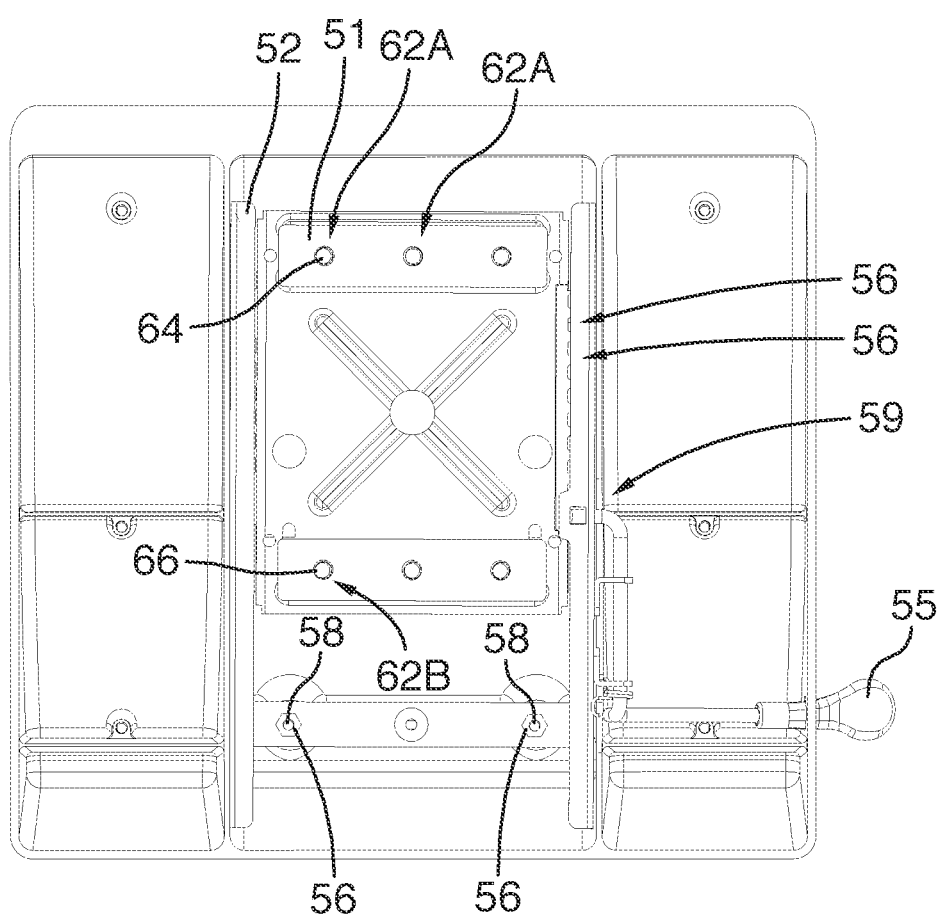
FIG. 9H is a rear view of the structure of FIG. 9A.
Figure 9I:
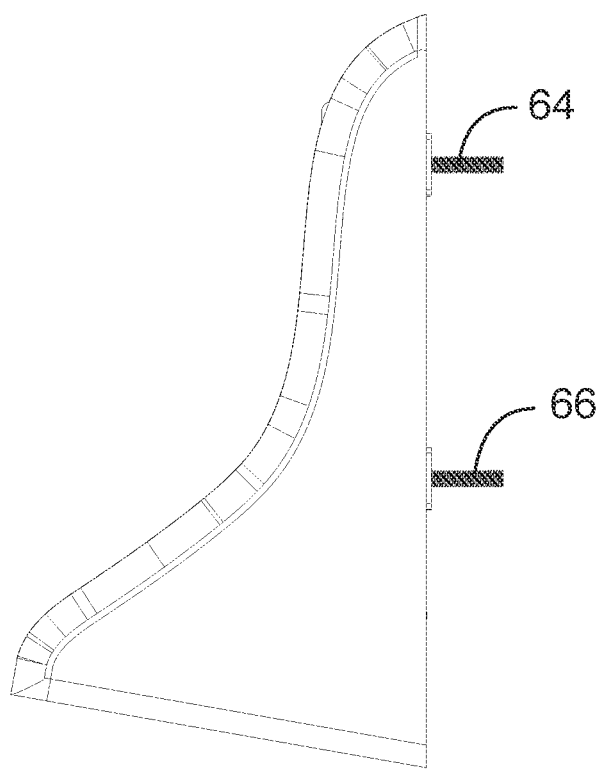
FIG. 9I is a left side view of the structure of FIG. 9A.

The apparatus is shown in use by a person in FIG. 8 and it will be seen, in use, that the surface of cover 40 generally follows the curvature of the buttocks of the person 58.

Whereas a single person and a single height of the support is shown in FIG. 8, it will be appreciated that, by virtue of the plurality of sockets 52, the height of the support can be adjusted, thereby to permit use by persons of varying height.

A further embodiment 20' is shown in FIGS. 9A-15.

Figure 10A:
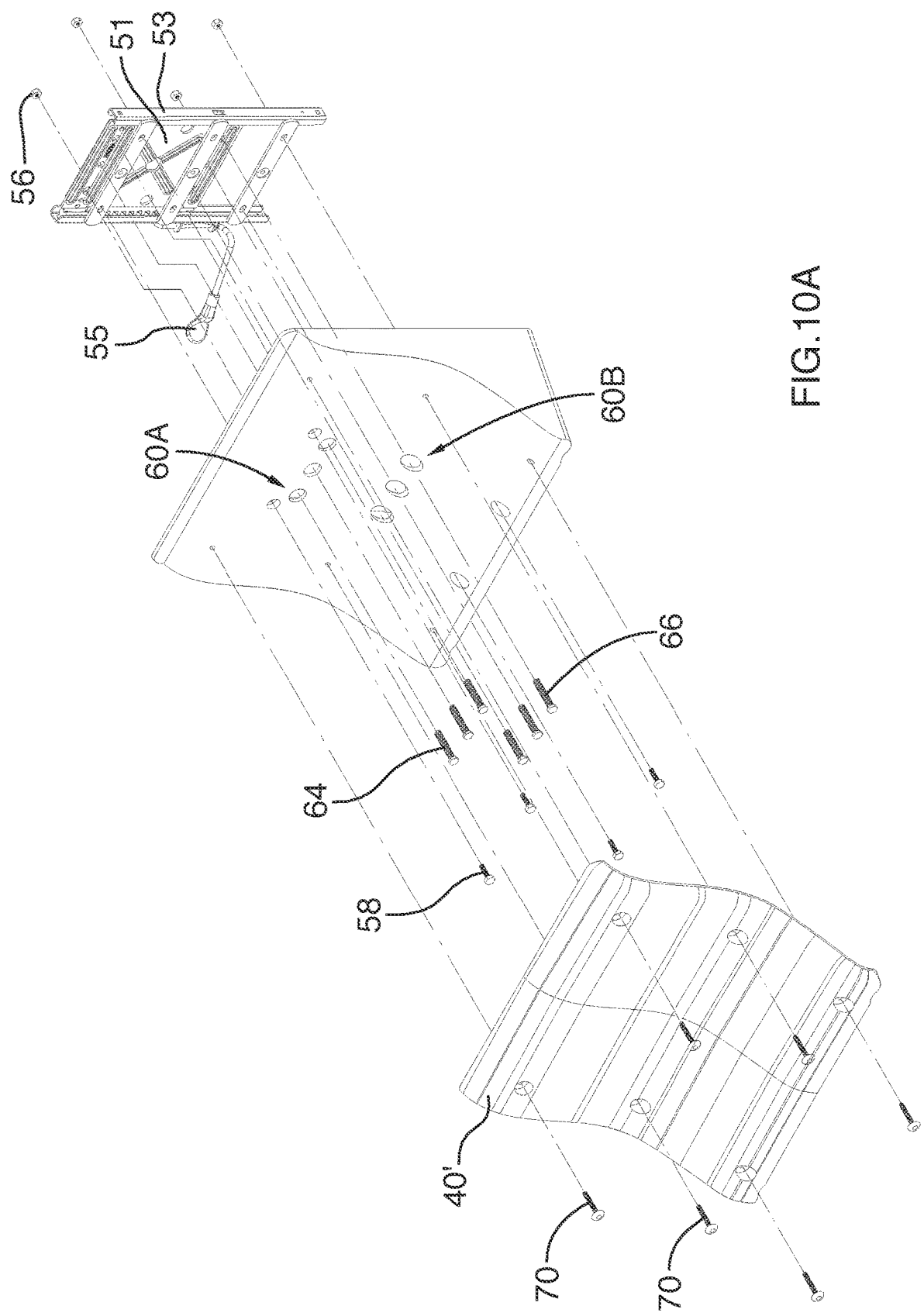
FIG. 10A is a front exploded view of the structure of FIG. 9A.

In this embodiment, a modified receiver 22' is provided, as is a modified support 24' and a modified cover 40', all as best seen in FIGS. 10A and 10B.

This receiver 22' includes a mounting plate 51, a slider 53 and a lever 55.

Figure 11A:
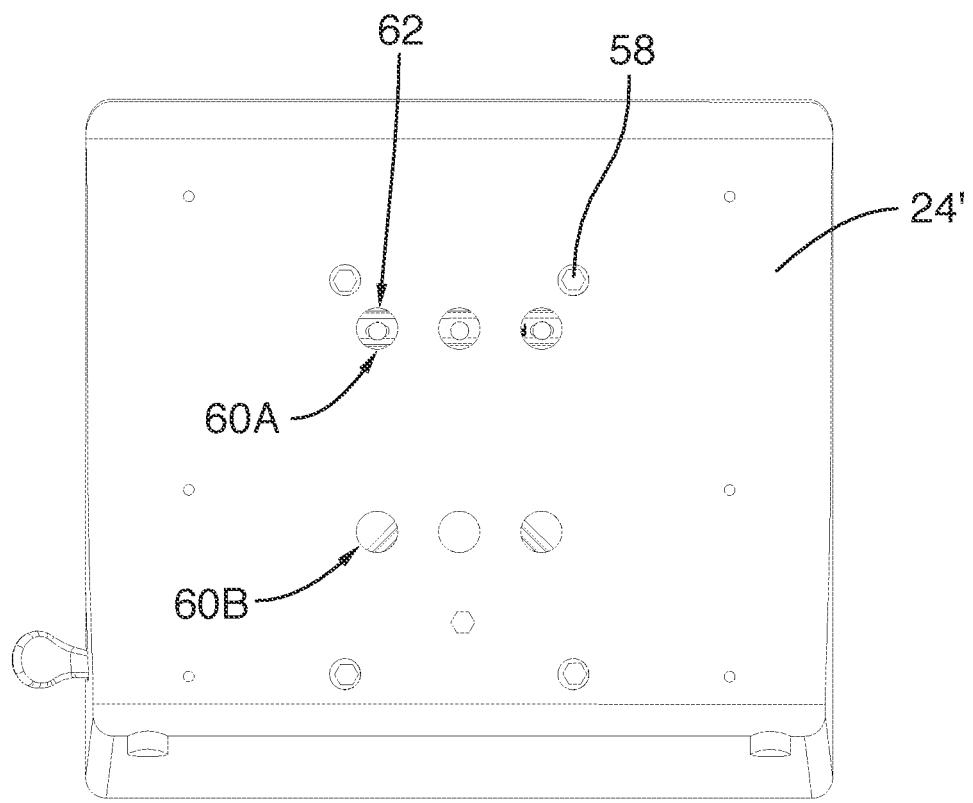
FIG. 11A is a view of the structure of encircled area 11A of FIG. 10A assembled for use.
Figure 11B:
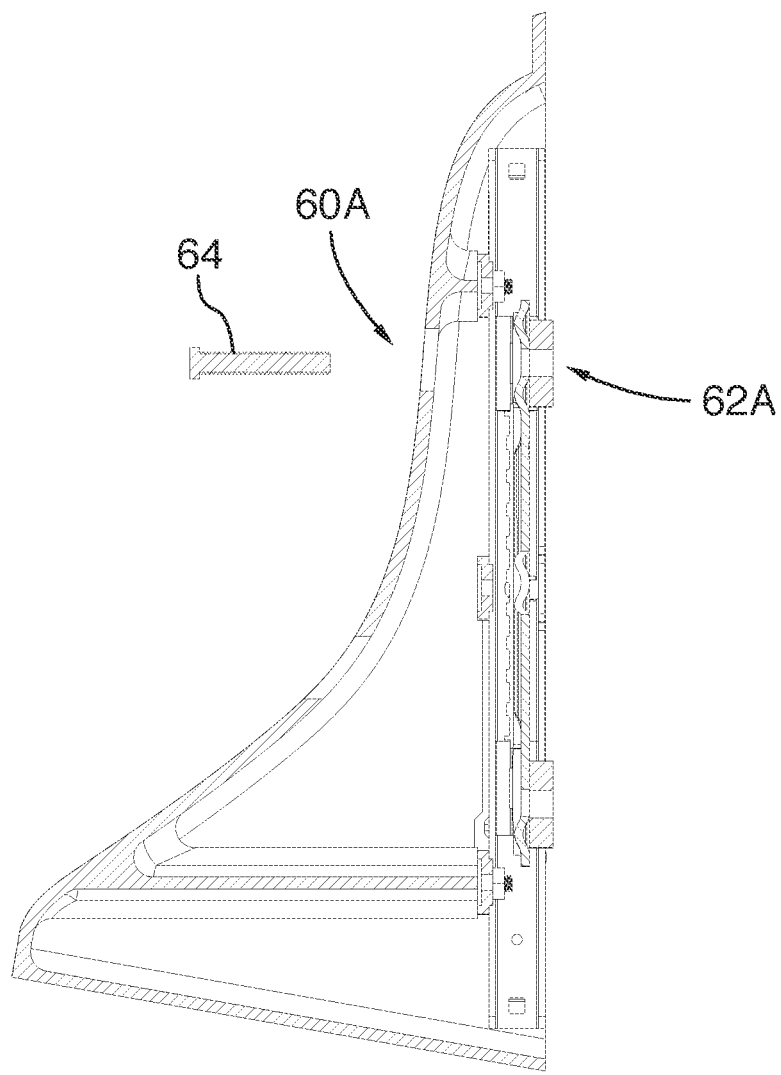
FIG. 11B is a view of the structure of encircled area 11B positioned for use with the structure of FIG. 11A.
Figure 11C:
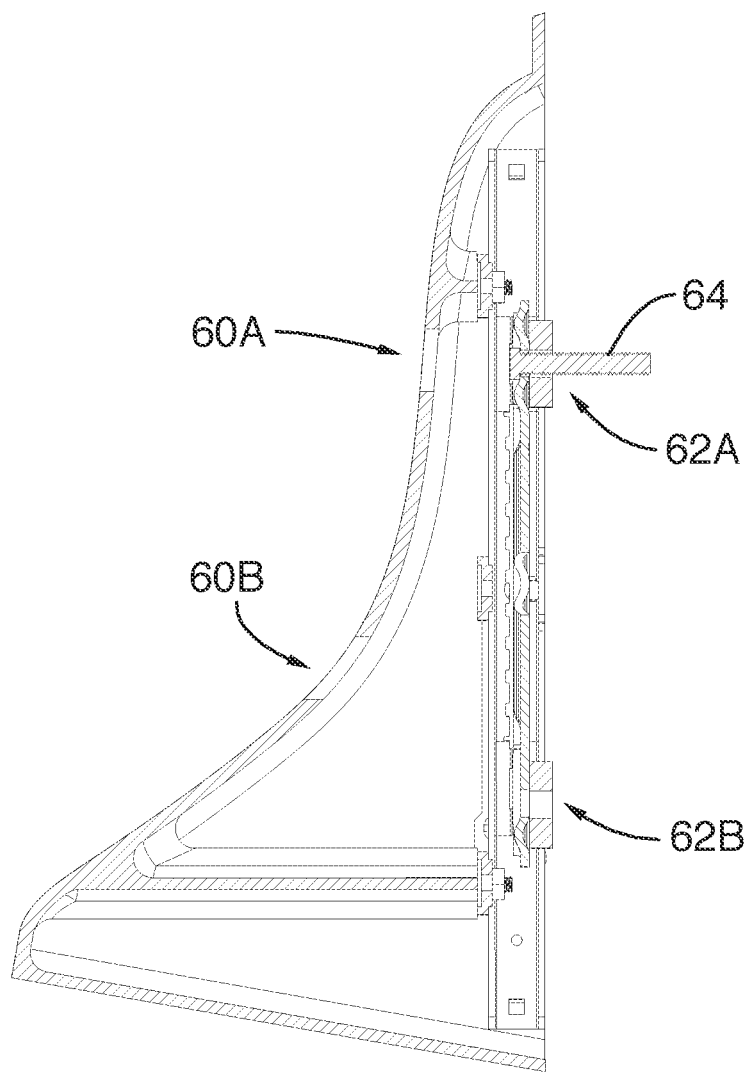
FIG. 11C is a view of the structure of FIG. 11B assembled for use.
Figure 11D:
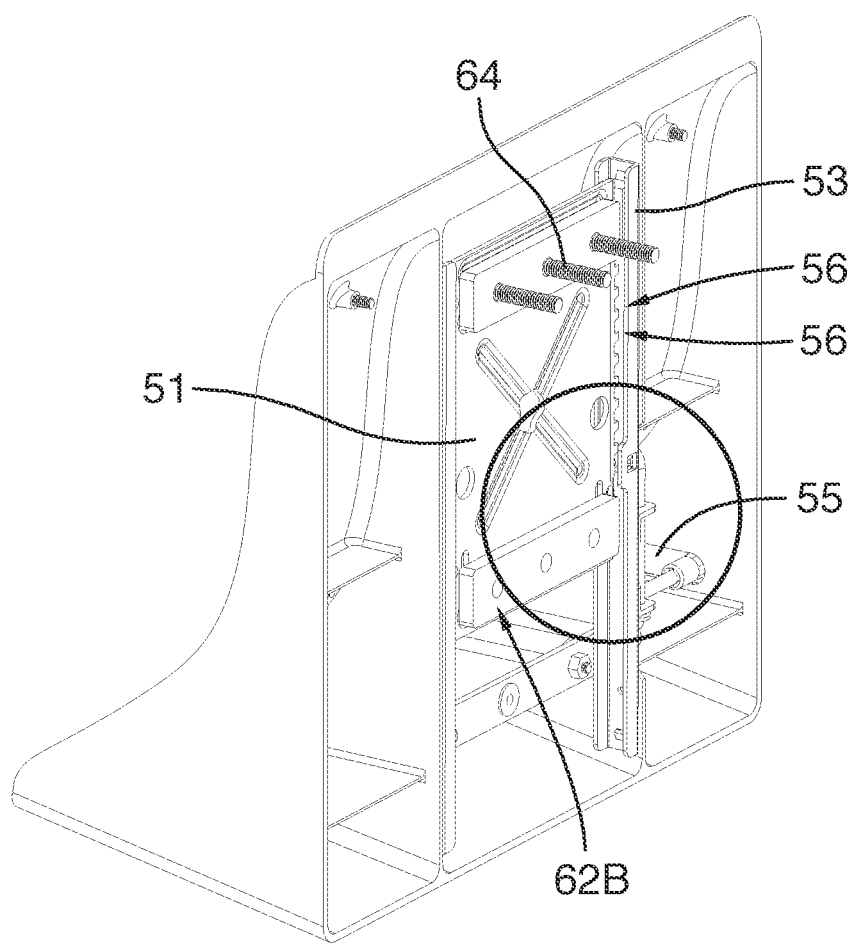
FIG. 11D is a rear view of the structure of FIG. 11C.

Plate 51 has a plurality of teeth 56 as seen for example in FIG. 11D.

Slider 53 is slidably mounted to mounting plate 51 plate 50.

Lever 55 is pivotably mounted to slider 53 and terminates in a pintle 59.

For use, support 24' is secured to plate 51 by nuts 56 and bolts 58 such that apertures 60A in support 24' are aligned with apertures 62A in mounting plate 51, as indicated by FIG. 11A, and mounting bolts 64 are passed through both and secured to a wall (not shown), as indicated by FIGS. 11B and 11C.

Figure 11E:
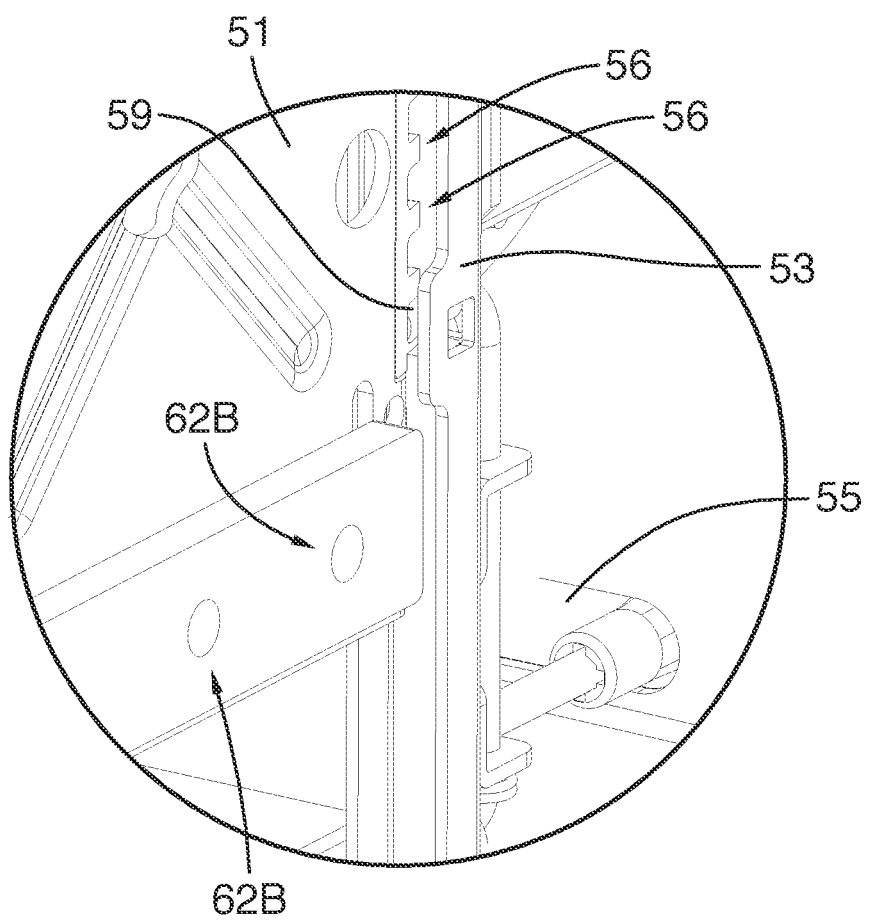
FIG. 11E is an enlarged view of the structure of encircled area 11E of FIG. 11D.
Figure 11F:
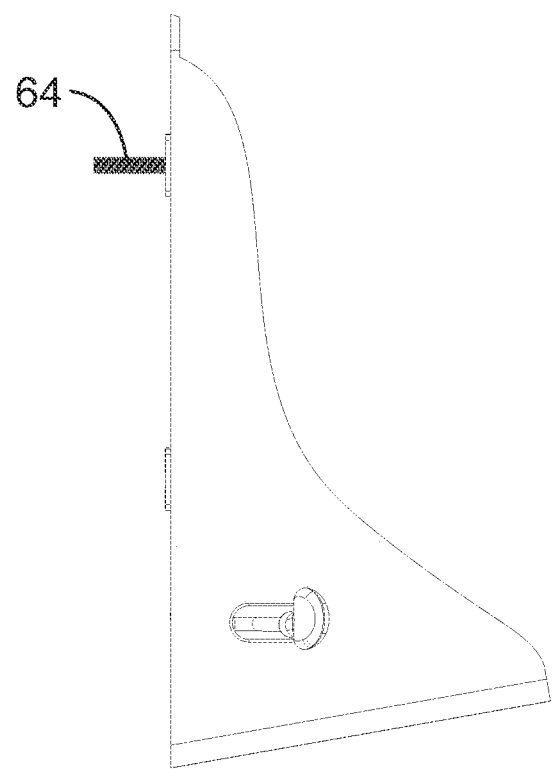
FIG. 11F is a side view of the structure of FIG. 11E.
Figure 12A:
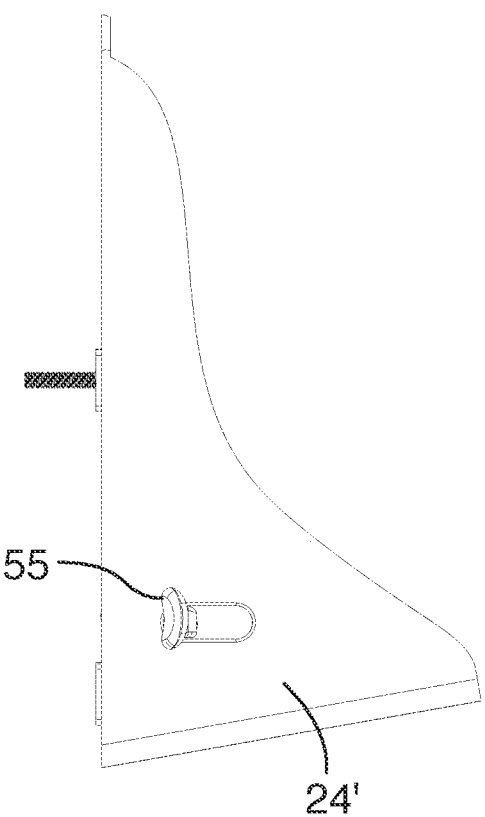
FIG. 12A is a view similar to FIG. 11F, with arm 56 pivoted.
Figure 12B:
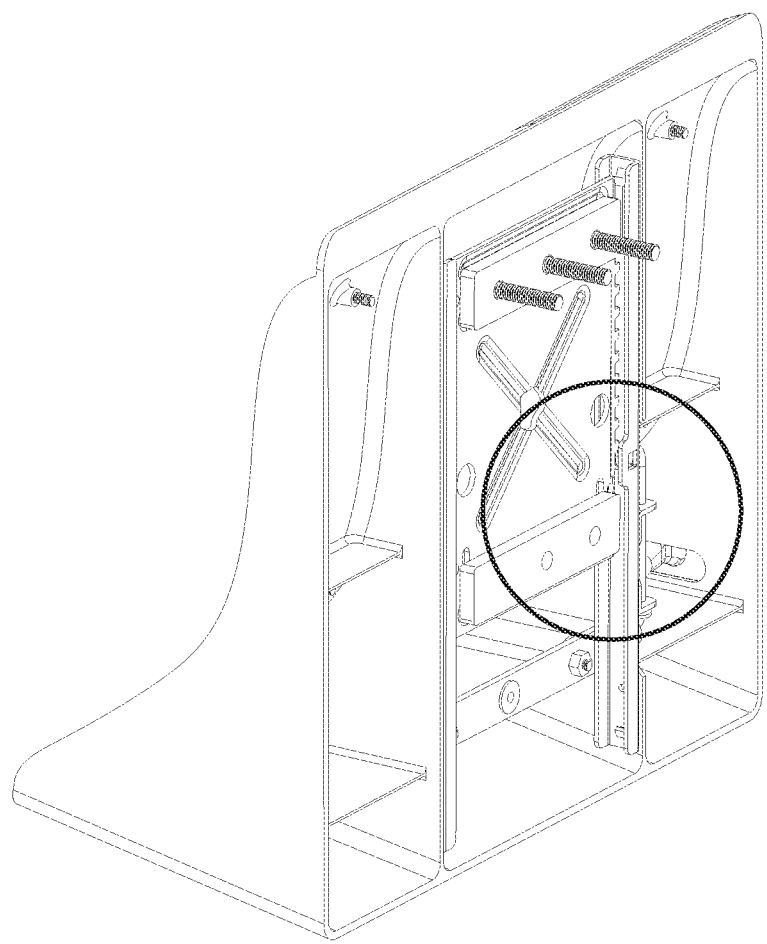
FIG. 12B is a view similar to FIG. 11D of the structure of FIG. 12A.
Figure 12C:
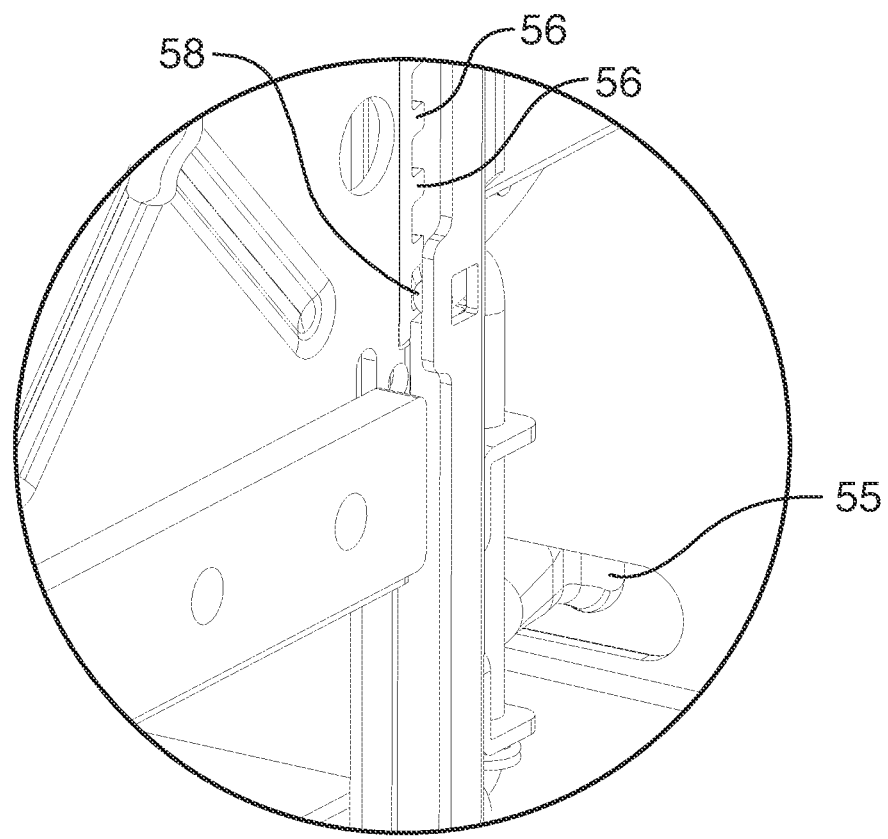
FIG. 12C is a view similar to FIG. 11E of the structure of FIG. 12A.
Figure 13A:
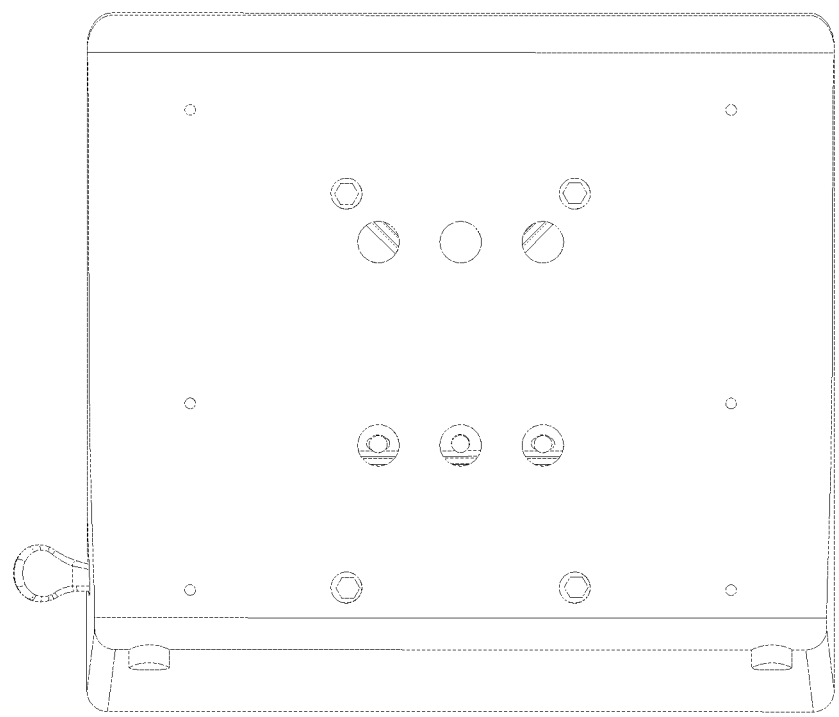
FIG. 13A is a view of the structure of FIG. 12C with portions repositioned.
Figure 13B:
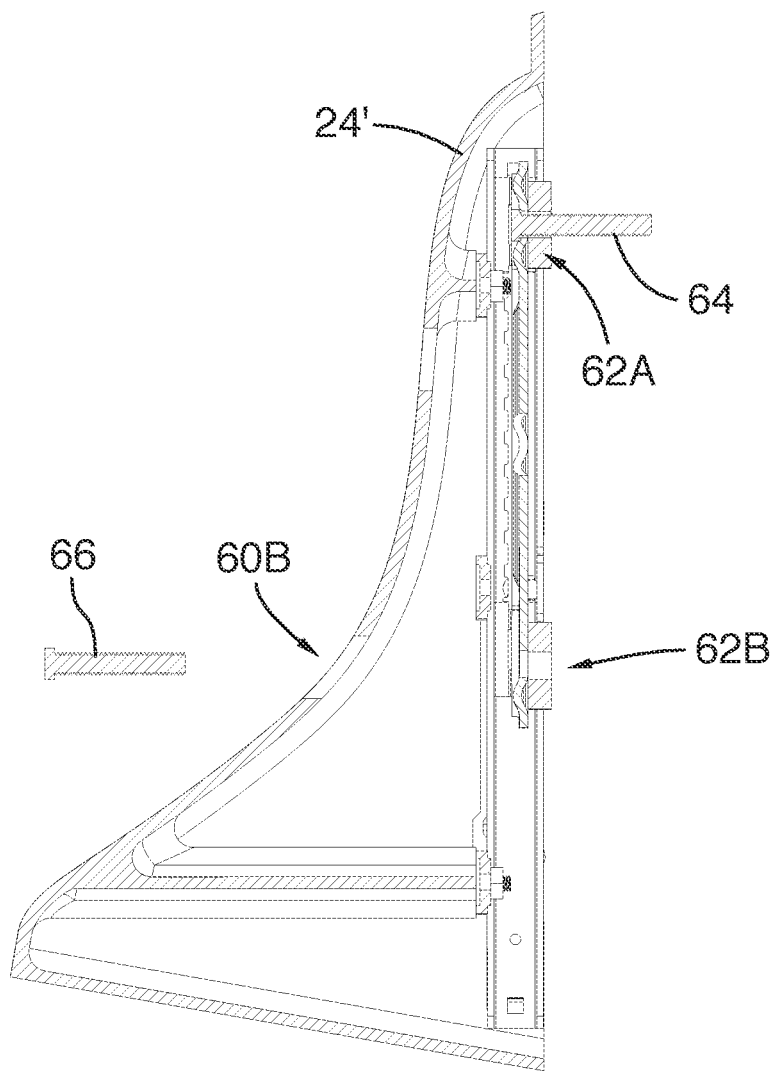
FIG. 13B is a view of the structure of encircled area 13B of FIG. 10A positioned for use with the structure of FIG. 13A.
Figure 13C:
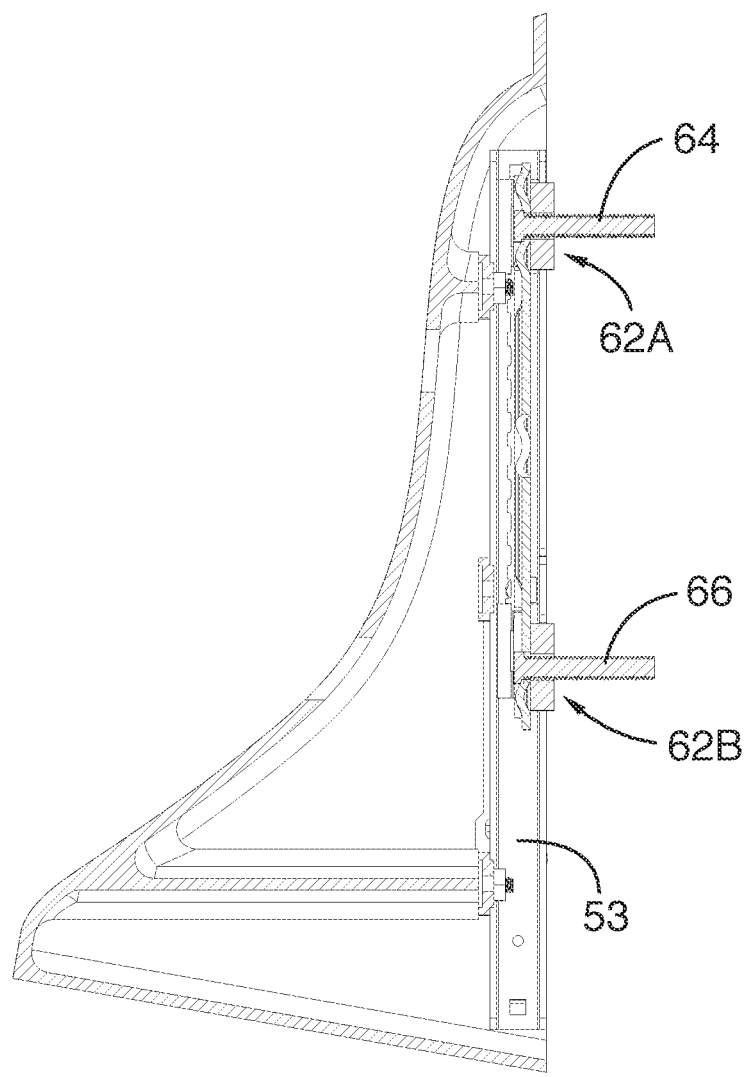
FIG. 13C is a view of the structure of FIG. 13B assembled for use.
Figure 14:
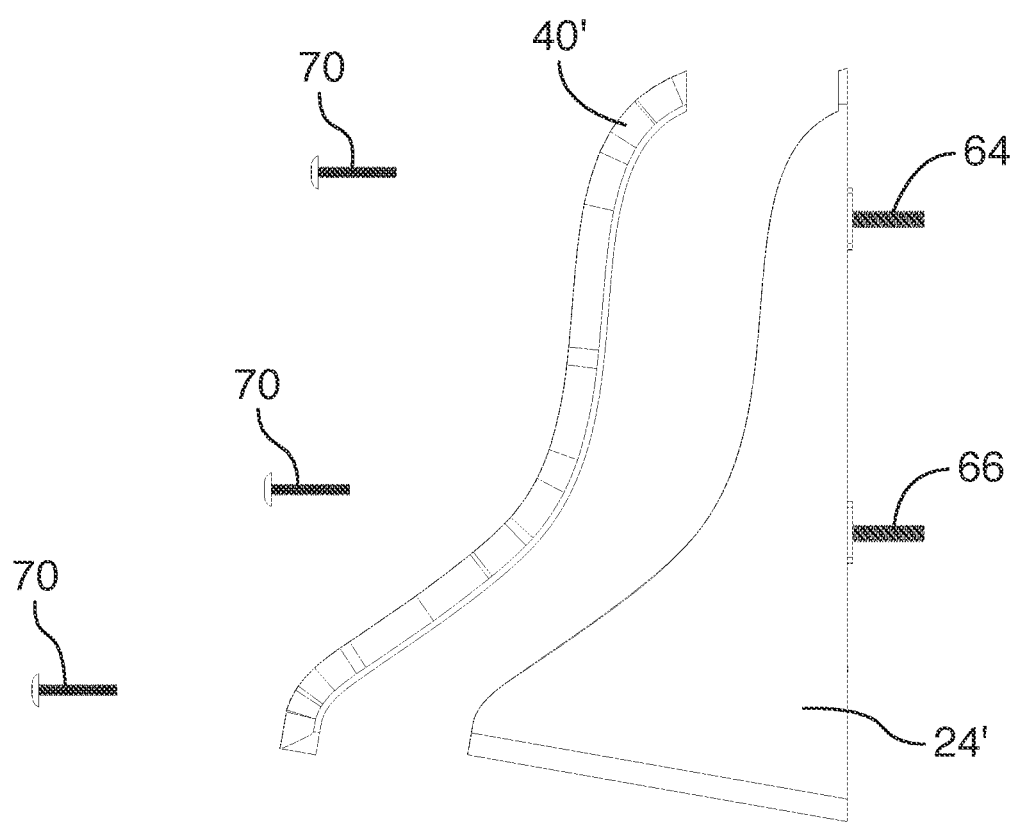
FIG. 14 is a view of the structure of encircled area 14 of FIG. 10A positioned for use with the structure of FIG. 13C.
Figure 15:
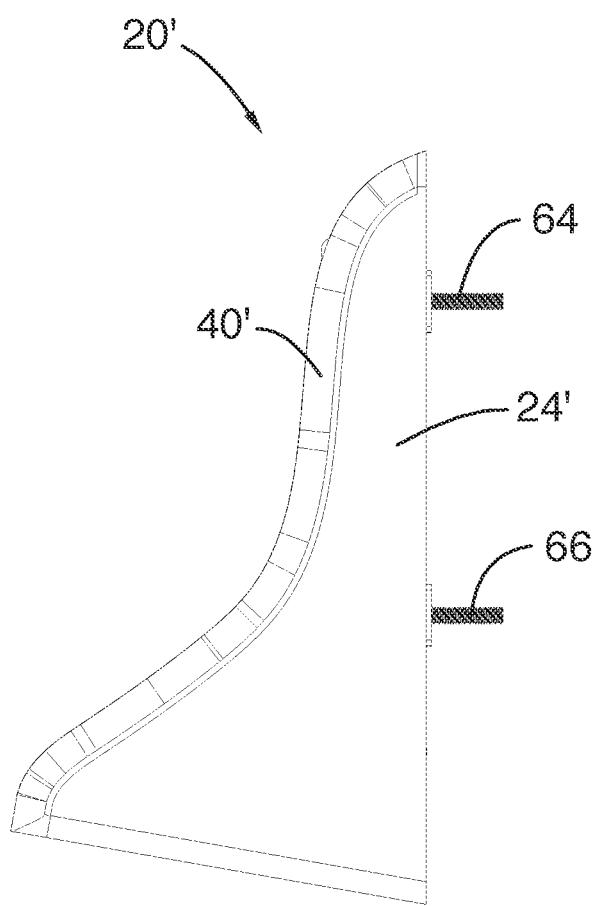
FIG. 15 is a view of the structure of FIG. 14 assembled for use.

Thereafter, lever 55 is pivoted rearwardly, thereby to release pintle 59 from teeth 56, as indicated by the sequence of FIGS. 11F and 12A and by the sequence of FIGS. 11E and 12C, whereupon support 24' and slider 53 can be moved relative to receiver 22' to bring apertures 60B in support 24' into alignment with apertures 62B in mounting plate 51 and bolts 66 can be passed therethough into the wall, as indicated by FIGS. 13B and 13C. [Support 24' can thereafter be placed into any desired vertical position relative to receiver 22' by commensurate movement of lever 55.]

Cover 40' can be secured to support 24' by bolts 70 to complete the installation.

Whereas two embodiments are illustrated, it will be evident that variations are possible.

For example, securement mechanisms, such as hook and loop fasteners could be used to secure the cover to the support.

Additionally, other adjusters, such as linear actuators could be used.

Further, whereas in the second embodiment, the cover is secured to the support with bolts that remain visible in the finished product, plugs could be used to conceal the bolt heads.

Accordingly, the invention will be understood to be limited only by the accompanying claims, purposively construed.

The invention claimed is:

1. Apparatus for use with a wall and by a person leaning against the wall, the person having buttocks and gluteus maximus muscles, the apparatus comprising:
   a receiver having a backing plate mounted in use to the wall, said receiver having a pair of flanges extending from the backing plate, the flanges each having upper and lower apertures;
   a support having an operative position whereat, the support is configured to follow the curvature of the buttocks of the person;
   a mechanism suspending the support from the receiver at the operative position, the mechanism having a capture plate with a vertically extending channel and a lower positioned toothed plate having a plurality of grooved sockets;
   an upper bolt extending between the upper pair of apertures and through the channel in the capture plate;
   a lower bolt extending between the lower pair of apertures such that, and upon displacing the upper bolt vertically along the channel, the lower bolt engages a selected one of the grooved sockets to permit the support to be moved between positions displaced from one another along a vertical axis.

2. Apparatus according to claim 1, wherein the support defines a concave surface which, in use by the person, configured to follow the contour of the gluteus maximus of the person, the support further defining a convex surface leading upwardly from the concave surface and a convex surface leading downwardly from the concave surface.

3. Apparatus according to claim 1, the support further comprising a plastic body in which a further socket is defined and further having a resilient foam cover engaging the plastic body.

4. Apparatus according to claim 1, the mechanism further comprising a pair of nuts engaging the upper and lower bolts.

5. An apparatus for use by a person leaning against a wall, comprising:
   a receiver having a backing plate adapted to be fixedly mounted to the wall;
   a support having a contoured body configured in a vertical direction to follow a curvature of a buttocks of the person;
   a mechanism for adjustably securing the support to the backing plate such that a vertically displaced position of the support is coincident with a vertical axis extending relative to the body and an orientation of the body being the same in each of multiple vertically adjusted positions; and
   the receiver further including a slider and a lever pivotally mounted to the slider and terminating in a pintle such that pivoting of the lever releases the pintle from a toothed plate molded within said body to permit displacement of the support relative to the backing plate.

6. The apparatus of claim 5, further comprising a pair of flanges extending from the backing plate, the flanges each having upper and lower apertures.

7. The apparatus of claim 6, the mechanism further comprising:
- a capture plate with a vertically extending channel, the toothed plate positioned below the capture plate and having a plurality of grooved sockets;
- an upper bolt extending between the upper pair of apertures and through the channel in the capture plate; and
- a lower bolt extending between the lower pair of apertures such that, and upon displacing the upper bolt vertically along the channel, the lower bolt engages a selected one of the grooved sockets to permit the support to be moved between positions displaced from one another along a vertical axis.

8. Apparatus according to claim 7, the mechanism further comprising a pair of nuts engaging the upper and lower bolts.

9. The apparatus according to claim 5, wherein the contoured body of the support defines a concave surface which, in use by the person, configured to follow the contour of the gluteus maximus of the person, the support further defining a convex surface leading upwardly from the concave surface and a convex surface leading downwardly from the concave surface.

10. The apparatus according to claim 5, the support further comprising a plastic body in which a further socket is defined and further having a resilient foam cover engaging the plastic body.

\* \* \* \* \*